Aug. 15, 1944.　　　L. E. HARPER　　　2,355,862
SELF CLOSING VALVE
Filed April 6, 1942
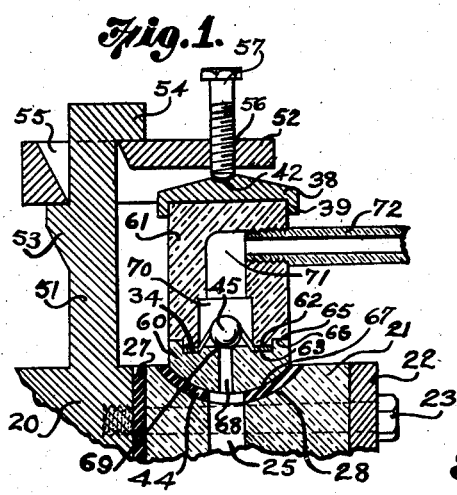
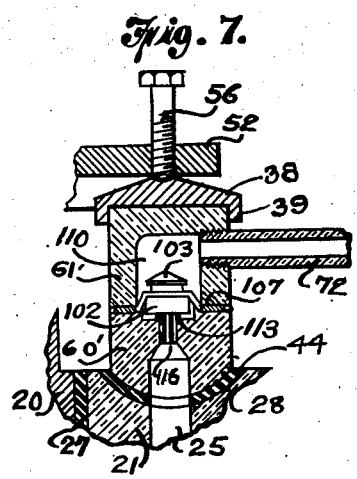
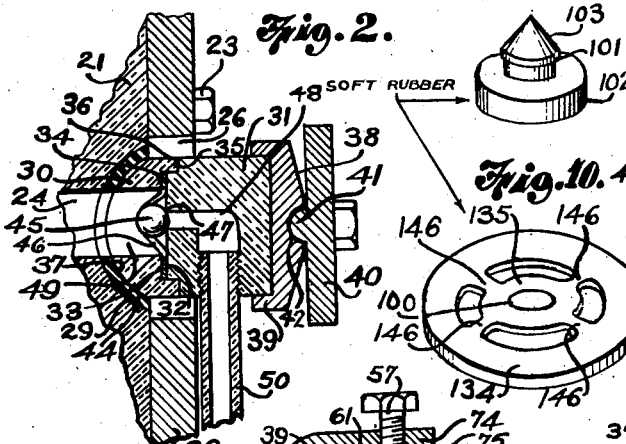
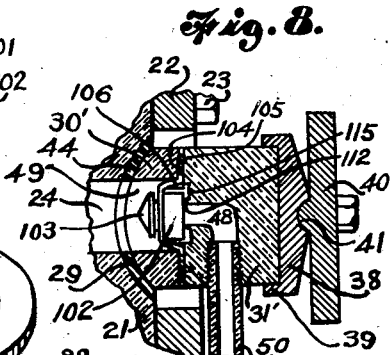
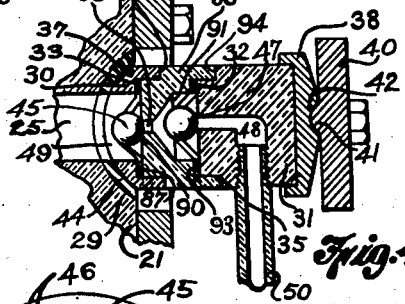
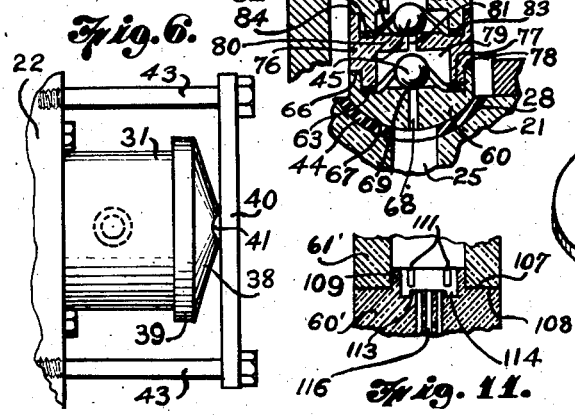
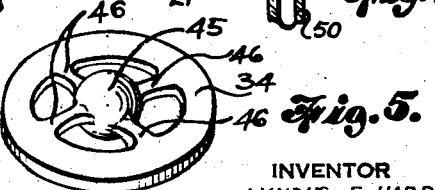
INVENTOR
LYNDUS E. HARPER
BY Alfred R. Fuchs
ATTORNEY Patented Aug. 15, 1944

2,355,862

UNITED STATES PATENT OFFICE 2,355,862

SELF-CLOSING VALVE

Lyndus E. Harper, Kansas City, Mo., assignor to Omega Machine Company, Kansas City, Mo., a corporation of Missouri Application April 6, 1942, Serial No. 437,873

12 Claims. (Cl. 277—70)

My invention relates to valves, and more particularly to self closing valves of the type commonly known as check valves.

It is a purpose of my invention to provide a valve of the above mentioned character that is particularly adapted for use in connection with the pumping of liquids of a corrosive character, which would have an undesirable effect on valves made of metal, or with metallic parts. This application is a continuation in part of my application Serial No. 354,164, filed August 26, 1940, now Patent No. 2,346,964, granted April 18, 1944, on Positive displacement pump, which discloses a pump particularly designed for use with such corrosive liquids.

It is one of the purposes of my invention to provide a new and improved valve mounting for a valve member on a pump body, or pump head, which is of such a character that the clamping means used for clamping the valve body to the pump body or head will positively seat the valve body in liquid tight relation to the pump body, or pump head, even though the clamping means should not be absolutely aligned properly with the seat for the valve body in the pump, or pump head, said seat being of a self aligning character so as to take care of any slight variations that may exist in the manufacture of the parts. This is of particular importance in connection with a pump head for a pump handling liquids of a corrosive character, because it is undesirable to use a metal pump head in such a pump and the means for securing the valve body to the pump must be of such a character that it will not put undue stresses on the material of the pump, or pump head, which is, preferably, made of a material that does not have the tensile strength of a metal such as ordinarily used for such purposes.

It is the particular purpose of my invention to provide a valve made up of a pair of body members, or casing members, that are secured together detachably by clamping means and which have a valve member cooperating with at least one thereof, which valve member is provided with means clamped between the adjacent valve body or casing members for holding the valve member in operative position. Preferably, said valve member comprises an outer annular or gasket portion that serves as a gasket member between the two portions of the valve body, being clamped therebetween, and an inner portion which carries the compressible valve member that cooperates with the valve seat, there being resilient band members extending between the outer annular member and said inner portion, which are tensioned when the valve is in position in the valve body to yieldingly hold said valve member in engagement with the valve seat. Preferably, the compressible valve member, or closure member, is separable from the mounting means, although if desired the closure, or valve member, and the mounting means can be made integral.

Other objects and advantages of my invention will appear as the description of the drawing proceeds. I desire to have it understood, however, that I do not intend to limit myself to the particular details shown or described, except as defined in the claims.

In the drawing:

Fig. 1 is a fragmentary sectional view showing my invention applied to an outlet or discharge valve.

Fig. 2 is a similar view showing my invention applied to an inlet valve.

Fig. 3 is a view similar to Fig. 1, of a modification.

Fig. 4 is a view similar to Fig. 2, of a modification.

Fig. 5 is a perspective view of one form of valve member used in carrying out my invention.

Fig. 6 is a fragmentary elevational view showing the valve clamping means used in conjunction with the inlet valve shown in Fig. 2, the view being taken substantially at right angles to Fig. 2.

Fig. 7 is a fragmentary sectional view showing the preferred form of my invention applied to an outlet valve.

Fig. 8 is a similar view of the preferred form of my invention applied to an inlet valve.

Fig. 9 is a perspective view of the closure member or valve plug member used in the preferred form of my invention.

Fig. 10 is a perspective view of the mounting member for the valve closure member or plug used in the preferred form of my invention, and Fig. 11 is a fragmentary enlarged detail sectional view of the cooperating valve body members at their adjacent ends, with the valve member omitted to more clearly show the structure of the body members.

Referring in detail to the drawing, my invention is shown as being applied to a pump having a body portion 20, to which a head 21 is secured by means of a clamping ring 22 and screw-threaded headed members 23. The head 21 is provided with an inlet passage 24 and an outlet or discharge passage 25, and the clamping plate or ring 22 is provided with an opening 26 axially aligned with the inlet passage 24. The pump body 20 is, preferably, made of metal and is separated from the corrosive liquid by means of a diaphragm 27, of which only a fragment is shown in the drawings, while the head 21 is, preferably, made of glass, hard rubber, or other plastic material, that will not be affected by the corrosive liquid coming in contact therewith. As the pump head and body portion are only illustrated to show the application of my improved valve means thereto, the same reference numerals are applied thereto in all the forms of the invention illustrated.

The head member 21 is provided with suitable seats or sockets for the valve bodies whereby the inlet and outlet valve bodies can be clamped to said head and screw-threaded connections entirely avoided and yet a tight joint obtained without placing any undue stresses on the material of the head. The seat for the outlet valve body is designated by the numeral 28 in the drawing, and that for the inlet valve body by the numeral 29. It will be noted that both the valve body seat or socket 28 and the valve body seat or socket 29 are of a concave character, and that the valve outlet passage 25 is substantially co-axially arranged relative to the valve body seat, or socket, 28, and the inlet passage 24 is substantially co-axially arranged relative to the valve body seat or socket 29. The inlet or intake valve body shown in Fig. 2 comprises or is made up of a pair of separable portions 30 and 31. The adjacent faces of said valve portions 30 and 31 are provided with offsets therein so as to provide an inner annular ledge or seat 32 on the body portion 31 opposite a similar ledge or seat 33 on the portion 30, between which is mounted an annular rim portion 34 of a valve member, said valve member being made, preferably, of a compressible material not affected by corrosive liquids, such as rubber, or rubber strengthened by fabric, or synthetic rubber or a rubber substitute having the characteristics of compressibility and resiliency that is required of said valve member. The body member 31 is also provided with an annular shoulder 35 that engages a corresponding annular shoulder 36 on the valve body member 30. The valve body member 30 is provided with a convex end face 37 corresponding in curvature to the concave seat 29. The valve body portions 30 and 31 may be made of molded plastic material, such as hard rubber, or other material that will not be affected by corrosive materials, such as glass, or other transparent material.

A metallic cap member 38 is, preferably, provided, which engages the outer end of the valve body portion 31 face to face, being provided with an annular flange 39 embracing the outer end of said body portion 31, and a clamping bar 40 is, preferably, provided, which has a rounded projection or rib 41 thereon, which seats in a rounded opening 42 in the cap member 38. The clamping bar 40, as will be obvious from Fig. 6, has a pair of bolts 43 extending therethrough that are screw-threadedly engaged with the metallic clamping plate 22. Preferably, a gasket 44 of compressible material, is provided between the concave seat 29 and the convex end 37 of the valve body member 30.

It will be obvious that the valve body can be clamped in position with the rim portion 34 of the valve member above referred to held in position between the members 30 and 31, due to being clamped between the shoulders 32 and 33, and the valve body clamped to the seat in the head member 21 by means of the clamping bar 40 by adjustment of the bolts 43. Due to the concave seat or recess 29 and the convex end wall 37 of the valve body portion 30, the valve body made up of the portions 30 and 31 will be clamped tightly in liquid-tight relation to the head 21 by means of said clamping bar 40, and any slight misalignment that might result, due to variations in the manufacture of the parts, will be compensated for by the rocking connection between the bar 40 and the cap member 38 and by the concavely and convexly curved seating faces of the socket for the valve body, and the pump body, respectively. Due to the fact that the annular outer portion 34 of the valve member is clamped in position between the two valve body portions 30 and 31, the position of said valve is determined and the joint is sealed between the two parts of the valve body because of the gasket-like character of the annular portion 34 of said valve member.

The valve comprises a valve plug member, which is shown as being a ball member 45 in the form of valve shown in Fig. 2, although the particular valve plug member at present preferred is of a somewhat different character from that shown in Fig. 2 and will be described below. The ball member 45 is connected with the annular ring-like portion 34 by means of connecting resilient band members 46, which are thin resilient strips of material of the same character as the portions 34 and 45. Any desired number of the members 46 may be provided, although four are shown in the drawing. The ball or plug member 45 is thus centered relative to the annular member 34, and the connecting members 46 being of a resilient character, will serve as a loading means for the valve to hold it against its seat. As will be evident from Fig. 5, the annular portion 34 and the radially extending members 46 lie in a common plane normally, and the valve plug member 45 projects in both directions from the opposite faces of the annular portion 34 and the connecting members 46.

The inlet valve is provided with a seat for said valve plug or ball valve member 45 at 47, which controls communication between the passage 48 in the valve body portion 30 and the passage 24, a passage 49 being provided in the valve body portion 30, which aligns with the passage 24 and which serves as a valve chamber. Any suitable conduit means, such as the tubular member 50, communicates with the passage 48. It will be noted that the valve seat 47 and the shoulder 32 on the valve body portion 31 are substantially in transverse alignment and that when the valve plug 45 is in position in the valve with the rim portion 34 of the valve member clamped against said shoulder 32 the connecting members 46 will be tensioned, as will be obvious from Fig. 2, and said members 46 being resilient will hold the ball member 45 against the seat 47 until there is a sufficient drop in pressure on the side of the valve facing the passage 24 relative to that on the side facing the passage 48 that the tendency of the resilient members 46 to seat the plug or closure member 45 will be overcome.

The means for mounting the outlet or discharge valve in position comprises an arm or bracket 51, to which is loosely connected a bar-like lever 52. An enlargement 53 is provided on the bracket 51, which provides a shoulder on said bracket, and a lateral enlargement or head 54 is also provided on said bracket 51, which is spaced from the enlargement 53. The bar-like member 52 is mounted between said shoulder and said head having an opening 55 therein loosely receiving the arm or bracket 52, said opening extending obliquely of the clamping lever or bar 52. Said clamping lever 52 is provided with a threaded opening 56, through which the headed screw-threaded member 57 extends, which member engages with the cap member 38 of the outlet valve, said cap member having a flange 39 and being provided with a rounded recess or socket 42, such as previously described in connection with the cap member on the inlet valve, said recess receiving the rounded end of the screw-threaded member 57.

The outlet valve is made up of a body member having the body portions 60 and 61, the valve body portion 60 having a similar relation to the valve body portion 61 that the valve body member 30, previously described, has to the valve body member 31. The valve body portion 61 has a ledge or seat 62 thereon opposite a similar ledge or seat 63 on the portion 60, between which is mounted the annular rim portion 34 of the valve member previously described, said valve member being made the same in both the inlet and outlet valves, and said shoulders 62 and 63 corresponding to the shoulders 32 and 33 of the valve body portions 31 and 30 previously described. The body member 61 is also provided with an annular shoulder 65 that engages the corresponding annular shoulder 66 on the valve body member 60, said shoulders corresponding to the shoulders 35 and 36 on the valve body members 31 and 30. The valve body member 60 is also provided with a convex end face 67 corresponding to the convex end face 37 of the valve body member 30, and corresponding in curvature to the concave seat 28 in the member 21.

The metallic cap member 38 cooperates with the valve body member 61 in a similar manner to that previously described, engaging the outer end wall thereof face to face and the flange 39 embracing the outer end of said body portion 61. The clamping means comprising the screw-threaded member 57 mounted on the arm 52 and the cap member 38 clamp the convex end 67 of the member 60 to the concave seat 28 with the gasket member 44, previously described, clamped between said convex and concave surfaces.

The valve body 60 has a restricted passage 68 therein, which leads through a central opening in the gasket member 44 from the outlet or discharge passage 25 to a valve seat 69 provided on the member 60 at the end thereof remote from the convex end wall 67 with which the valve plug member 45 engages, being held in engagement yieldingly therewith in the same manner previously described, due to the fact that said seat 69 substantially aligns transversely with the shoulders provided for engaging the rim portion 34 of the valve means, the valve being, of course, clamped in position between the two body portions 60 and 61 in a similar manner to that previously described.

The valve body portion 61 has an enlarged bore 70 therein providing a valve chamber and a passage 71 extending from said chamber 70 to the discharge pipe 72, which is connected with the body portion in any suitable manner, as by a threaded connection with a screw-threaded opening in said body portion 61. It will be obvious that if the pressure within the pump and thus within the discharge passage 25 becomes higher than that in the chamber 70 or 71, the valve plug or closure member 45 will become unseated and liquid will be discharged from the pump into the outlet pipe 72.

In Fig. 3 a slight modification is shown, in which instead of providing the bracket 51 and bar 52, a bracket member 73 is provided having a transversely extending portion 74, with which the screw-threaded headed member 57 engages in the screw-threaded opening 75, the same engaging a cap member 38 such as has been previously described. An outlet valve is shown in Fig. 3, which is secured to a pump head 21, such as that previously described, by the clamping means comprising the bracket, the cap and the screw-threaded member above referred to. The valve body member 60 previously described, is utilized in the modification shown in Fig. 3 and is constructed in the same manner as has been previously described. It will be noted that due to the provision of the pair of offset annular shoulders, interfitting or telescoping portions are provided on the members 60 and 61 shown in Fig. 1, holding the same in axial alignment, and that said members 60 and 61 are firmly held in axial alignment. It will also be noted that a gasket member 44 is provided between the concave wall of the socket or valve body seat 28 and the convex end wall 67 of the member 60 in Fig. 3 just as in the form of the invention shown in Fig. 1. However, instead of having the body member 61 interfitted with the body member 60 as described in connection with Fig. 1, the body member 60 cooperates with an intermediate body member 76, of which one is shown in Fig. 3, but it will become obvious upon further description of this form of the invention that any number of said members 76 can be provided, dependent upon the number of loaded check valves that may be desired in the outlet valve structure.

Said member 76 is provided with an annular shoulder 77 that cooperates with the annular shoulder 63 on the body member 60, and with an annular shoulder 78 that cooperates with the annular shoulder 66 on said member 60 in the same manner as the shoulders 65 and 62 on the member 61 cooperate therewith in the form of the invention shown in Fig. 1, a valve member being thus clamped in position at its rim portion between opposing shoulders or ledges on said members 60 and 76. The valve plug member 45 of this valve means cooperates with the seat 69 in the same manner as previously described, and a valve chamber 79 is provided within the member 76 to accommodate the valve mechanism. Said member 76 is provided with a transverse wall portion 80, which is provided with a restricted passage 81 therein, providing a valve seat 82 at the end thereof opposite that opening into the chamber 79, and said member 76 further has annular shoulders 83 and 84 thereon that cooperate with the annular shoulders 62 and 65 of the body member 61. The annular shoulders 62 and 83 cooperate to clamp the rim portion of the valve having the plug or closure member 45 cooperating with the seat 82 in position between said valve body member 61 and the intermediate body member 76 in a similar manner to that previously described, so as to yieldingly hold the valve plug 45 in engagement with said seat. The member 61 is made in the same manner as previously described, although being somewhat reduced in height in order to accommodate the valve having a plurality of check valve members therein in the space between the transverse portion 74 of the bracket and the member 21, and the outlet connection 72 extends from the chamber 71 in the same manner as previously described.

In Fig. 4 a slight modification of the inlet valve is shown, the same being secured to the pump head in the same manner as shown in Fig. 2, the clamping bar 40 connected with the ring-like member 22 cooperating with the cap member 38 in the same manner as has been described in connection with Fig. 2. The valve body member 30, previously described, is provided in the form of the invention shown in Fig. 4 and is constructed in the same manner as has been previously described, the gasket member 44 being provided between the concave wall 29 of the socket portion and the convex end wall 37 of the member 30, as previously described. However, instead of having the body member 30 interfitted with the body member 31, as in the form shown in Fig. 2, the body member 30 cooperates with an intermediate body member 86, which is somewhat similar to the intermediate body member 76, but is of a reversed character to that of the intermediate member 76. Said intermediate member 86 has an annular shoulder 87 corresponding to the annular shoulder 77 on the member 76, and an annular shoulder 88 corresponding to the annular shoulder 78 on the member 76, but instead of a valve chamber in the end thereof facing the body member of the valve nearest the pump head, has a restricted passage 89 therein providing a valve seat 90 for the valve plug or closure member 45. A recess providing a valve chamber 91 is in the opposite end thereof, which is that provided with the annular shoulders 93 and 94 corresponding to the annular shoulders 83 and 84 provided on the member 76, which cooperate with the annular shoulders 32 and 35, respectively, on the member 31, previously described. The rim portion 34 of one valve member is clamped between the shoulders 87 and 33 on the members 30 and 86 and the rim portion 34 of the other valve member is clamped between the shoulder 32 on the member 31 and the shoulder 93 on the member 86, and the valve closure member or plug 45 of the valve member clamped between the portions 31 and 86 engaging the valve seat 47, the relationship of the parts of the valve means and the relationship of the valve seats and shoulders being the same as previously described, whereby the tension in the connecting members 46 is provided, holding the valve closure members 45 to their seats yieldingly.

It will thus be seen that multiple check valves that can serve both as inlet and outlet valves can thus be provided and that the number of valve closure members utilized will be dependent upon the number of members 76 or 86 nested together, for it will be obvious that the shoulders 77 and 78 on the member 76 correspond to the shoulders 65 and 62 on the member 61, and that the shoulders 83 and 84 on the member 76 correspond to the shoulders 63 and 66 on the member 60, and that therefore one end of the member 76 can always be nested with the opposite end of the next member 76 in a similar manner to which the members 60 and 61, or the members 60 and 76, or 76 and 61, can be nested to align with each other to clamp the rim portion of a valve member therebetween. It will also be noted that the member 86 is similarly formed so as to be capable of being interfitted with another member 86 on either end thereof, or with a member 30 or a member 31, as the case may be. Accordingly any number of these valve members can be utilized in multiple as may be desired and all operate in the same manner.

I have found that from a production standpoint and operating standpoint, the form of valve member illustrated in Figs. 7 to 11, inclusive, is preferred. The valve means in the inlet and outlet valves is exactly the same in construction and is similar to the valve means illustrated in the other forms of the invention, having a rim portion 134, which constitutes the outer annular portion of said valve means and having also an inner annular portion 135 connected with the outer annular portion 134 by means of the radially extending portions 146, thus providing an inner and an outer annular portion connected together by resilient band portions, the portions 134, 135 and 146 being, preferably, integrally made of rubber or similar compressible resilient material, of either a synthetic or natural character. A central substantially circular opening 100 is provided in said valve means for receiving the reduced neck portion 101 of a valve plug member having the disk-like enlargement 102 constituting the valve seat engaging portion of said closure plug and having a substantially conical head portion 103 thereon, the head portions 102 of a flat disk-like character, and 103 of a conical character, being on opposite sides of the reduced connecting portion 101, which is of substantially a size to fit in the opening 100, said plug member being thus capable of being interlocked with the mounting member by forcing the tapered end of the conical head portion 103 through the opening 100 past the shoulder provided between the head 103 and the reduced portion 101, whereby said plug member will snap into interlocked position with the mounting means, being carried by the inner annular portion 135 with the disk-like closure plug 102 in position to engage a valve seat of either an inlet or outlet valve, as the case may be, when the rim portion 134 of the mounting member is clamped in position between the shoulders of the valve body portions in a manner similar to that previously described.

A slightly modified form of valve body members is shown in Figs. 7, 8 and 11, in which the inlet valve shown in Fig. 8 is provided with a body portion 30', similar to the body portion 30 and cooperating with the concave seat 29 and the gasket member 44 in a similar manner to that previously described, but instead of being shouldered as is the member 30 on the end thereof facing the body member 31, the member 30' merely has a flat end face 104 perpendicular to the axis thereof, which cooperates with an annular shoulder 105 on the member 31', said member 31' having an annular rim or rib portion 106 for telescopic engagement with the cylindrical wall of the passage 49 of the member 30' for holding the portions 31' and 30' in axial alignment. The member 61' of the outlet valve is merely provided with a flat end face 107, instead of being shouldered, which engages with an annular shoulder 108 on the body member 60', and has an annular rib portion 109 thereon that telescopes within the substantially cylindrical valve chamber 110 provided in the body member 61' of this form of outlet valve. The annular rib portion 109 and the annular rib portion 106 are similarly arranged and related to the corresponding cooperating valve body portion, and both serve the same purpose.

In Fig. 11 the valve means has been omitted in order to show more clearly the cooperative relation between the annular shoulders and annular rib portions, whereby clamping faces are provided for the rim portion 134 of the valve mounting member and the telescoping joint is provided between the two portions of the valve casing, that is, the body member 60' and the body member 61' or the body member 30' and the body member 31', as the case may be. In either case the annular rib, such as the rib portion 109 illustrated in Fig. 11, is provided with a number of slots or notches 111 therein, corresponding to the number of connecting members 146 provided between the rim portion 134 and the annular portion 135 of the valve mounting means, so that said rib will not interfere in any way with the operation of the valve means.

Instead of the valve plug member 102 merely seating against a corner of the restricted passage of the member that has the valve seat, as in the previously described forms of the invention, both the inlet valve member and the outlet valve member are provided with raised annular seats, with which the flat faces of the valve plugs engage. The projecting annular valve seat of the inlet valve member is designated in Fig. 8 by the numeral 112 and surrounds the opening of the passage 48 in the member 31', while in the outlet valve the member 60' is provided with such a projecting annular seat, the same being indicated by the numeral 113 in Figs. 7 and 11, and in both cases lying within the annular recess formed within the annular rib portion 106 or 109, as the case may be, the bottom of this recess being slightly offset from the shoulder 108 on the member 61', as shown at 114 in Fig. 11, and from the shoulder 105 as shown at 115 in Fig. 8, to place the sealing edge of the annular seat 113 substantially in transverse alignment with the shoulder 108 and the sealing edge of the annular rib portion 112 substantially in transverse alignment with the annular shoulder 105, said arrangement of shoulders and the enlarged character of the valve plug 102 and its projection from one face of the valve mounting member, as will be obvious from Figs. 7 and 8, causing tensioning of the resilient band portions 146 to hold the flat sealing face of the enlargement 102 of the valve plug or closure member in sealing engagement with the valve seat with which it cooperates. The other parts shown in Figs. 7 and 8 are similar to those previously described in conjunction with the other forms of the invention and cooperate with the valve members in the same manner and are designated by the same reference numerals in Figs. 7 and 8 as in the other figures of the drawings. Instead of providing a single passage leading to the valve seat through the body portion 60', it has been found desirable to provide a plurality of passages 116 therein when the valve plug member 102 is used.

Preferably, the valve body members in all forms of the invention, as well as the intermediate members, are made of some form of transparent material, such as glass, or transparent plastic material, not affected by corrosive liquids, or the same may be made of hard rubber, while the valve mounting members and the valve plug members are, preferably, made of rubber having the elasticity and the compressibility common in rubber gaskets and rubber closure or sealing members provided in valves. In the form of the invention shown in Figs. 7 to 11, the valve means comprising the plug member and the mounting means therefor can be made of two different characters of resilient compressible material, if desired, so that the band or connecting portions 146 will have greater elasticity than the material of which the plug member is made.

While my invention is particularly adapted for use in connection with the pumping of corrosive liquids and the parts of the valves are, preferably, made of materials that are not attacked by corrosive materials, such as rubber, glass and materials having similar characteristics to rubber and glass, yet for certain uses the valve body portions could be made of metal and even the valve mounting means could be made of a highly resilient metal, but of course, under those circumstances, if any high pressures are encountered it would be necessary to use additional gasket means between the valve body portions at the joints between the same and some of the advantages of making the valve mounting means serve both as a valve mounting means and as a gasket means would not exist.

What I claim is:

1. The combination with a member having a concave valve body seat therein and a passage leading to said seat, of a valve body comprising a body portion having a convex end wall cooperating with said seat, a body portion detachable therefrom, a valve member having a compressible portion mounted between said body portions, and a single means for simultaneously clamping said body portions to each other and said valve body to said seat.

2. The combination with a member having a concave valve body seat therein and a passage leading to said seat, of a valve body comprising a body portion having a convex end wall cooperating with said seat, a body portion detachable therefrom, a valve member having a portion mounted between said body portions, and a single means for simultaneously clamping said body portions to each other and said valve body to said seat, said means clamping said valve member in position.

3. The combination with a member having a concave valve body seat therein and a passage leading to said seat, of a valve body comprising a body portion having a convex end wall cooperating with said seat, a body portion detachable therefrom, a ball valve member having a portion surrounding said ball and flexibly connected therewith mounted between said body portions, and means for clamping said body portions to each other and said valve body to said seat, said means clamping said valve member in position.

4. The combination with a member having a seat therein and a passage leading to said seat, of a valve body comprising a body portion having an end wall cooperating with said seat, a body portion detachable therefrom, a valve member having a compressible portion mounted between said body portions, and means having rocking engagement with said valve body for clamping said body portions to each other and said valve body to said seat, said body portions having interfitting means for aligning the same with each other, said clamping means clamping said compressible portion between said body portions.

5. The combination with a member having a socket therein, of a valve mechanism comprising a valve body comprising a plurality of interfitting axially aligned portions, means engaging one of said axially aligned portions to clamp another thereof in said socket, a plurality of said valve body portions having valve seats and a plurality of valve member each comprising a valve, an annular portion clamped between a pair of adjacent valve body portions and resilient means connecting said valves with said clamped portions to yieldingly hold said valves to said seats, said adjacent body portions having means cooperating with said annular portion to align said valve with a valve seat.

6. A valve comprising a pair of body portions each having passages therein, a valve seat on the end face of one of said body portions, a pair of cooperating shoulders on the adjacent ends of said body portions, a valve member comprising a compressible rim portion engaging said shoulders, a sealing member engaging said valve seat and narrow resilient band members connected with said sealing member and said rim portion and extensible to tension the same and urge said sealing member toward said seat, and means for clamping said body portions together to clamp said rim portion between said shoulders with said sealing member in cooperative relation to said seat.

7. A valve comprising a pair of body portions each having passages therein, a valve seat on the end face of one of said body portions, a pair of cooperating shoulders on the adjacent ends of said body portions, a valve member comprising a compressible rim portion engaging said shoulders, a sealing member engaging said valve seat and narrow resilient band members connected with said sealing member and said rim portion, and means for clamping said body portions together to clamp said rim portion between said shoulders with said sealing member in cooperative relation to said seat, said shoulder on said body portion having said valve seat thereon being substantially in transverse alignment with said valve seat and said rim portion and resilient members normally lying in a common plane, said sealing member normally projecting from the plane of said rim portion and resilient members to extend said resilient members to tension the same to yieldingly hold said sealing member in engagement with said valve seat when said rim portion is clamped between said shoulders.

8. A valve comprising a pair of body portions each having passages therein, a valve seat on the end face of one of said body portions, a pair of cooperating shoulders on the adjacent ends of said body portions, a valve member comprising a compressible rim portion engaging said shoulders, a sealing member engaging said valve seat and resilient members connected with said sealing member and said rim portion, and means for clamping said body portions together to clamp said rim portion between said shoulders with said sealing member in cooperative relation to said seat, said shoulder on said body portion having said valve seat thereon being substantially in transverse alignment with said valve seat and said rim portion and resilient members normally lying in a common plane, said sealing member normally projecting from the plane of said rim portion and resilient members to tension said resilient members to yieldingly hold said sealing member in engagement with said valve seat when said rim portion is clamped between said shoulders, said sealing member being detachable from its mounting.

9. The combination with a member having a concave socket therein, of a valve mechanism comprising a valve body comprising a plurality of interfitting axially aligned portions, clamping means rockably engaging one of said axially aligned portions to clamp another thereof in said socket, said last mentioned portion having a concave end mounted in said socket to permit said portion to rock in said socket, a plurality of said valve body portions having valve seats, and a plurality of valve members each comprising a compressible portion mounted between a pair of adjacent interfitting valve body portions.

10. The combination with a member having a socket therein, of a valve mechanism comprising a valve body comprising a plurality of interfitting axially aligned portions, means engaging the extremity of one of said axially aligned portions to clamp the opposite extremity of another thereof in said socket, and valve means comprising a compressible portion mounted between adjacent interfitting body portions, said other valve body portion and said socket having cooperating curved wall portions to provide a rocking connection between said valve body and said socket.

11. The combination with a member having a socket therein, of a valve mechanism comprising a valve body comprising a plurality of interfitting axially aligned portions, a clamping member rockably engaging one of said axially aligned portions to clamp another thereof in said socket, said latter body portion and said socket being formed to permit said valve body to rock in said socket, and valve means comprising a compressible portion mounted between adjacent interfitting body portions.

12. The combination with a member having a socket therein, of a valve mechanism comprising a valve body comprising a plurality of interfitting axially aligned portions, means engaging one of said axially aligned portions to clamp another thereof in said socket, said one portion having a universally tiltable connection with said clamping means and said other portion having a universally tiltable connection with said socket, and valve means comprising a portion mounted between adjacent interfitting body portions.

LYNDUS E. HARPER.